(12) United States Patent
Hudgins et al.

(10) Patent No.: US 6,270,262 B1
(45) Date of Patent: Aug. 7, 2001

(54) OPTICAL INTERCONNECT MODULE

(75) Inventors: Clay E. Hudgins, Palm Bay; Louis R. Paradiso, Satellite Beach, both of FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/438,031

(22) Filed: Nov. 10, 1999

(51) Int. Cl.[7] .................................................. G02B 6/36
(52) U.S. Cl. ........................ 385/88; 385/53; 385/147; 385/89; 385/92; 361/699
(58) Field of Search ............................. 385/88, 53, 147, 385/14, 89, 92; 361/688, 689, 699

(56) References Cited

U.S. PATENT DOCUMENTS

| | | | |
|---|---|---|---|
| 3,365,620 | 1/1968 | Butler et al. | 317/101 |
| 3,582,865 | 6/1971 | Franck | 339/17 |
| 3,586,917 | 6/1971 | Oates | 317/100 |
| 4,547,834 | 10/1985 | Dumont et al. | 361/386 |
| 4,998,803 | 3/1991 | Salour et al. | 350/321 |
| 5,159,529 | 10/1992 | Lovgren et al. | 361/385 |
| 5,200,631 | 4/1993 | Austin et al. | 257/81 |
| 5,265,113 | 11/1993 | Halldorsson et al. | 372/36 |
| 5,317,656 | 5/1994 | Moslehi et al. | 385/12 |
| 5,675,473 | 10/1997 | McDunn et al. | 361/699 |
| 5,818,692 | 10/1998 | Denney, Jr. et al. | 361/699 |

Primary Examiner—Rodney Bovernick
Assistant Examiner—Sung Pak
(74) Attorney, Agent, or Firm—Allen, Dyer, Doppelt, Milbrath & Gilchrist, P.A.

(57) ABSTRACT

An optical interconnect module includes a pair of rectangular configured circuit boards spaced in close proximity to each other and each having an outer circuit carrying side. An inner plenum is defined between the boards and the boards form an open end. A mounting member engages the circuit boards and secures the boards together to form a module. Electronic components are mounted on the outer circuit carrying sides and a cooling core is mounted within the inner plenum and engages the circuit boards for cooling the electronic components mounted on the circuit boards as coolant is passed through the cooling core. An optoelectronic transducer assembly is mounted at the open end of the module and operatively connected to a circuit carrying side of one of the circuit boards. The cooling core engages the optoelectronic transducer assembly to provide cooling to the transducer assembly. An optical fiber is mounted in communication with the optoelectronic transducer assembly at the open end of the module.

30 Claims, 3 Drawing Sheets

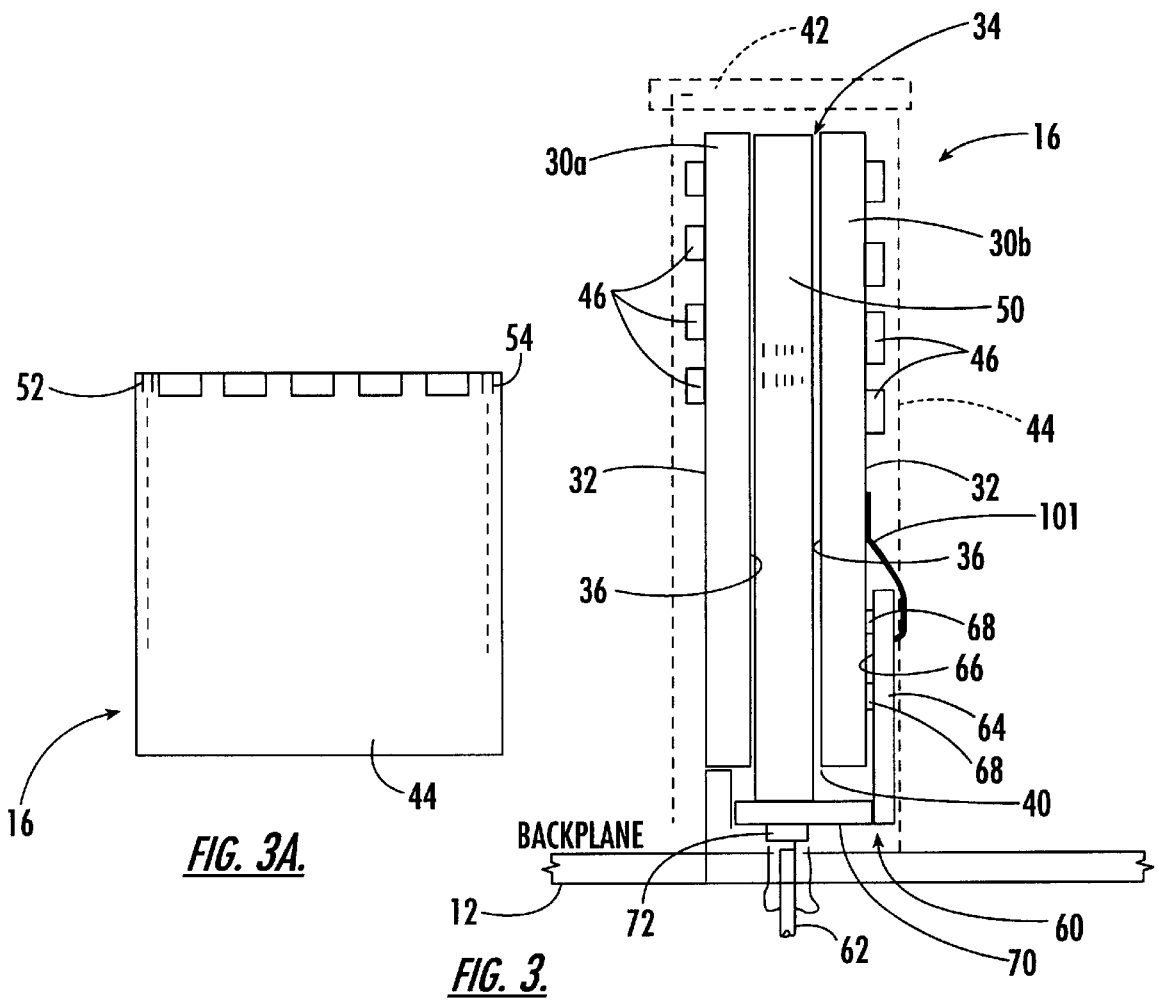
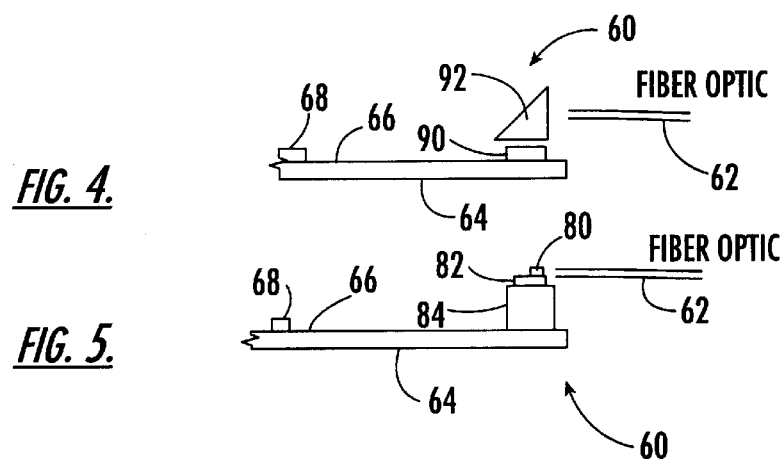

US 6,270,262 B1

OPTICAL INTERCONNECT MODULE

FIELD OF THE INVENTION

This invention relates to the field of fiber optical connections with optoelectronic transducers, and more particulary, this invention relates to an optical interconnect module used for connecting optical fibers to optoelectronic transducers and electronic components mounted on printed wiring circuit boards.

BACKGROUND OF THE INVENTION

In many military electronics used in airborne applications, circuit boards are cooled in a more efficient manner than typically used for commercial electronic applications. For example, jet aircraft are designed to fly at high altitudes where there is little oxygen and air that could be used for standard cooling of electronic components as in personal computers, where a fan blows air over the integrated circuit chip and other components. Often designers of the various electronic components that are used in fighter aircraft and other high altitude aircraft place circuit boards in close proximity to each other and insert a perforated core between the two circuit boards. A fluid, such as a liquid or a gas, is forced through the perforated core to cool the electronic components. Often, fiber optic communication systems are used in combination with optoelectronic transducers. However, the total thickness of these modules formed by opposing circuit boards should be thin, because the modules are stacked in racks throughout the aircraft. Thus, when optoelectronic transducers are placed on the outside of the boards, the width of the boards, together with the height of the optoelectronic transducers, becomes greater than the designed specifications. Additionally, optoelectronic transducers are more temperature sensitive and tend to become heated up by adjacent electronic components. Thus, not only is there a problem in prior art components concerning the general overall width of these electronic optical interconnect module, but there is also the problem that opticoelectronic transducers, which receive and transmit light signals, become less efficient, and may even cease to function due to heat from adjacent and nearby electronic components also mounted on the circuit boards.

SUMMARY OF THE INVENTION

It is therefore an object of the present invention to provide an optical interconnect module where an optoelectronic transducer is mounted separately from electronic components that are normally mounted on the circuit carrying face of printed wire circuit boards and cooled separately.

It is still another object of the present invention to provide an optical interconnect module that has minimum thickness in accordance with many specifications for fixed and rotary wing aircraft.

In accordance with the present invention, an optical interconnect module includes a pair of rectangular configured circuit boards spaced in close proximity to each other. Each pair of rectangular configured circuit boards includes an outer circuit carrying side. An inner plenum is defined between the boards and open end is formed. A mounting member engages the circuit boards and secures the boards together to form a module. A plurality of electronic components are mounted on the outer circuit carrying sides.

A cooling core is mounted within the inner plenum and engages the circuit boards for cooling the electronic components mounted on the circuit boards as coolant is passed through the cooling core. At least one optoelectronic transducer assembly is mounted at the open end of the formed module and operatively connected to a circuit carrying face of one of the circuit boards. The cooling core engages the optoelectronic transducer assembly and provides cooling to the transducer assembly. An optical fiber is mounted in communication with the optoelectronic transducer assembly at the open end of the formed module.

In still another aspect of the present invention, the optoelectronic transducer assembly further comprises a substantially planar substrate having a die carrying face mounted opposite a circuit carrying face of a circuit board. An electronic die is mounted on the die carrying face and at least one of the electronic die is mounted on the die carrying face and is electrically connected to a circuit formed on the circuit carrying face. A circuit carrying extension is mounted on the planar substrate and extends over the open end of the formed module. A diode is mounted on the circuit carrying extension.

In still another aspect of the present invention, the optoelectronic transducer assembly can further comprise a substantially planar substrate having a die carrying face mounted opposite a circuit carrying face of a circuit board. The electronic die is mounted on the die carrying face and at least one of the electronic die is mounted on the die carrying face and is electrically connected to a circuit formed on the circuit carrying side. A laser is supported by the planar substrate and mounted over the open end of the formed module. A copper mounting block and ceramic support member can support the laser on the planar substrate.

In still another aspect of the present invention, the optoelectronic transducer assembly can further comprise a substantially planar substrate having a die carrying face mounted opposite a circuit carrying face of a circuit board. An electronic die is mounted on the die carrying face and at least one of the electronic die is mounted on the die carrying face and electrically connected to a circuit formed on the circuit carrying side. A diode and prism are supported by the planar substrate and mounted over the open end of the formed module.

In still another aspect of the present invention, the cooling core can comprise a perforated core member through which fluid is passed between the pair of rectangular configured circuit boards. In still another aspect of the present invention, the coolant can comprise a fluid, or can be a gas. The cooling core includes an inlet and outlet for fluid.

In yet another aspect of the present invention, an optical interconnect assembly comprises a fiber optic back plane having a plurality of receiving slots for receiving an optical interconnect module within each slot. The fiber optic back plane includes a cooling circuit and coolant fittings positioned at each slot through which coolant can be passed through an optical interconnect module positioned within each receiving slot. At least one optical interconnect module is connected within the receiving slot. This optical interconnect module can further comprise a pair of rectangular configured circuit boards spaced in close proximity to each other and having two outer circuit carrying sides, an inner plenum defined between the boards, and an open end. A mounting member is fixed into the receiving slot and engages the circuit boards and secures the boards together to form a module. A plurality of electronic components are mounted on the outer circuit carrying faces. A cooling core is mounted within the inner plenum and connected to the coolant fittings for receiving coolant. The cooling core engages the circuit boards for cooling the electronic components mounted on the circuit boards as coolant is passed through the cooling core. At least one optoelectronic transducer assembly is mounted at the open end of the module and operatively connected to a circuit carrying side of one of the circuit boards. The cooling core engages the optoelectronic transducer assembly to provide cooling to the transducer assembly. An optical fiber is mounted in communication with the optoelectronic transducer assembly at the open end of the formed module.

BRIEF DESCRIPTION OF THE DRAWINGS

Other objects, features and advantages of the present invention will become apparent from the detailed description of the invention which follows, when considered in light of the accompanying drawings in which:

FIG. 3 is a schematic, side sectional view showing an optical interconnect module of FIG. 1.

FIG. 3A is a schematic plan view of a module of FIG. 3 showing a plurality of optoelectronic transducers and inlet and outlet for fluid.

FIGS. 4 and 5 show alternate aspects of an optoelectronic transducer assembly mounted at the open end of the foreign module, as compared to the optoelectronic transducer assembly shown in FIG. 3.

DETAILED DESCRIPTION OF THE PREFERRED EMBODIMENTS

The present invention is advantageous because it now allows an optical interconnect module having optoelectronic transducer assemblies to take advantage of the module's thickness in a unique manner allowing the use of taller optoelectronic transducers, such as a transmitter and receive component, than conventional packaging techniques allow. Additionally, the conductive cooling path is now more effectively used against the optoelectronic transducer. Also, the optoelectronic transducer, which is temperature sensitive and prone to being heated by other components, is now removed from proximity of the other components on the circuit boards.

Figure 1:
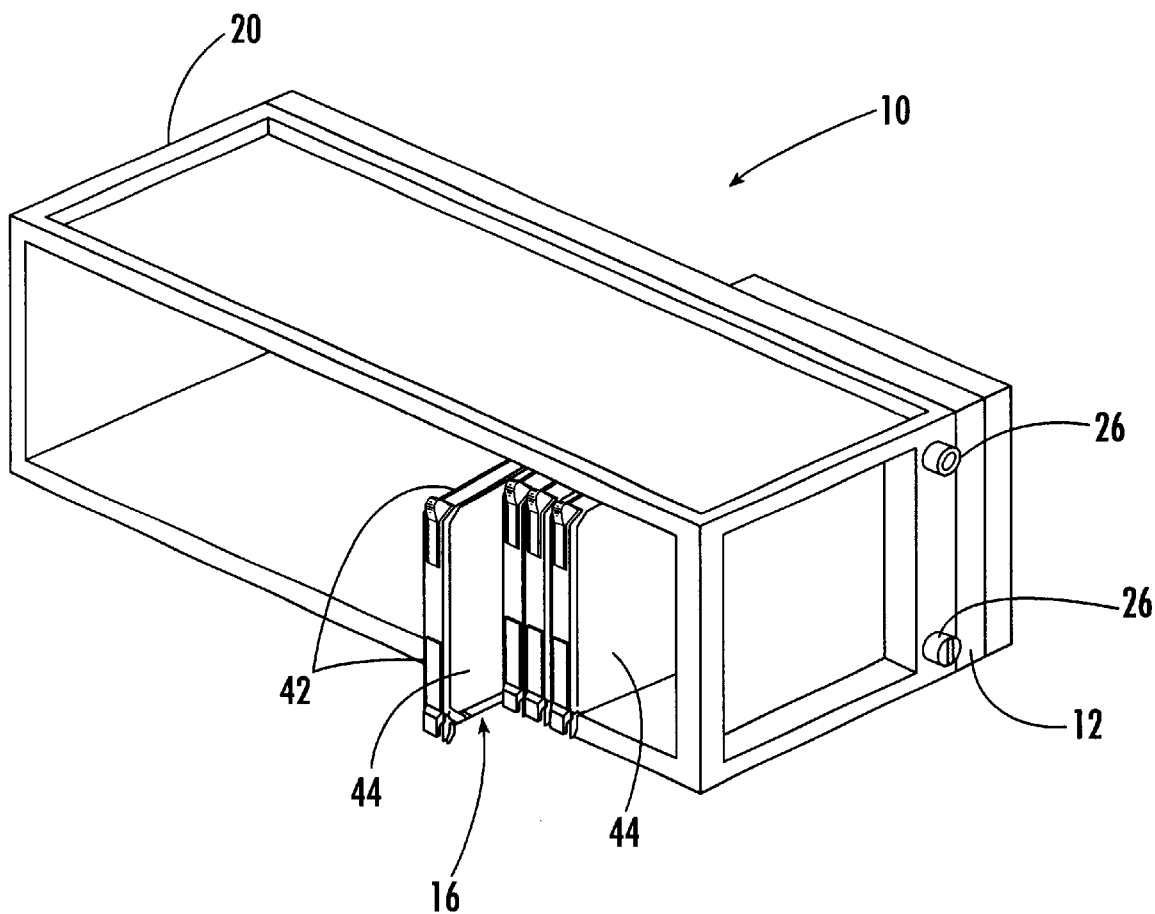
FIG. 1 is an isometric view of an optical interconnect assembly showing a fiber optic back plane with receiving slots that receive a plurality of optical interconnect modules of the present invention.

As shown in FIG. 1, an optical interconnect assembly 10 includes a fiber optic back plane 12 that has a plurality of module receiving slots 14 for receiving optical interconnect modules 16 within each slot. Four optical interconnect modules 16 are illustrated with one (the most left hand side) optical interconnect module slightly pulled out from the frame box 20 that connects to the fiber optic back plane 12. As is well known to those skilled in the art, the fiber optic back plane 12 includes various optical signals that enter the back plane through connection interface 22 and extend through the back plane 12 by means of optical fibers and terminate at different receiving slots 14 adjacent the frame box 20. The back plane also includes a cooling circuit 24 and cooling fittings 26 positioned at each module receiving slot 14 through which coolant can be passed to an optical interconnect module 10 positioned within each receiving slot 14. A number of these frame boxes 20 can be positioned within an aircraft, as is well known to those skilled in the art.

Figure 2:
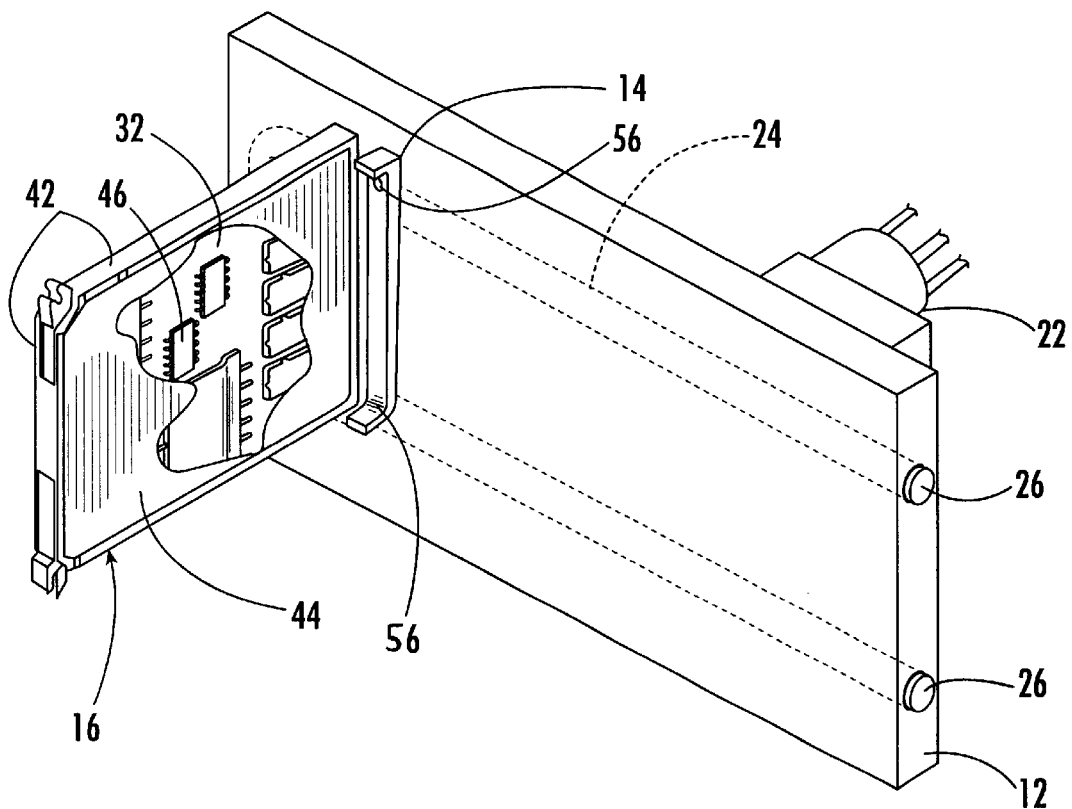
FIG. 2 is another isometric view of an optical interconnect module that is connected to a fiber optic back plane of FIG. 1.

As further illustrated in FIGS. 2 and 3, each optical interconnect module 16 includes a pair of rectangular configured printed wiring circuit boards 30a, 30b, which are spaced in close proximity to each other. Each printed wiring circuit board 30a, 30b includes an outer circuit carrying face 32, such that an inner plenum 34 is defined between the inside surfaces 26 of the boards. The two boards 30a, 30b form an open end 40. A mounting member 42 engages the circuit boards 30a, 30b and secures the boards together to form a module as illustrated.

As shown in FIG. 2, the mounting member 42 extends around the outside perimeter formed by the pair of rectangular configured printed wiring circuit boards 30a, 30b to secure the two boards together. A protective outer face panel 44, such as formed from an insulator material of thin dimension, as is well known to those skilled in the art, is formed opposite each of the outer circuit carrying faces 32 in spaced relation to allow the electronic components 46 to be mounted on the circuit carrying faces of each circuit board. The total thickness of the module, including the outer face panel 44 and the board is about 0.6 inches thick, in accordance with many specifications for fixed and rotary wind aircraft.

As shown in FIGS. 2 and 3, a plurality of electronic components 46 are mounted on the outer circuit carrying faces. A cooling core 50 is also mounted within the plenum 34 and engages the circuit boards 30a, 30b for cooling the electronic components mounted on the circuit boards as coolant is passed through the cooling core 50. The cooling core 50 can comprise a perforated core member through which fluid is passed between the pair of rectangular configured printed wiring circuit boards. The coolant can comprise a fluid or gas and the core includes an inlet 52 and outlet 54 for fluid as shown in FIG. 3A. This inlet 52 and outlet 54 for the fluid to the coolant fittings 56 (FIG. 2) positioned at each slot through which coolant can be passed through the optical interconnect module via the inlet and outlet.

At least one optoelectronic transducer assembly 60 is mounted at the open end 40 of the foreign module and operatively connected to a circuit carrying face of one of the printed wiring circuit boards. FIG. 3A illustrates a plurality of assemblies 60 mounted at the open end 40. Thus, the cooling core 50 engages the optoelectronic transducer assemblies to provide cooling to the transducer assembly. An optical fiber 62 is mounted in communication with the optoelectronic transducer assembly at the open end of the module as shown in FIGS. 3–5. In one aspect of the invention, the optoelectronic transducer assembly 60 includes a substantially planar substrate 64 having a die carrying face 66 opposite the circuit carrying face 32 of a circuit board 30a and positioned adjacent the open end of the module.

Electronic die 68, such as analog components, are mounted on the die carrying face. These typically analog components are used to carry communication signals and other signals that are ultimately carried by the fiber optic back plane 12. At least one of the electronic die 68 mounted on the die carrying face is electrically connected to a circuit formed on the board 32. This circuit could include a ball grid array and/or flexible circuit 101 to connect the planar substrate to the circuit carrying face of the board 32.

As shown in FIG. 3, an electrically conductive extension member 70 extends from the planar substrate 64 over the open end of the module. This electrically conductive extension member 70 could include another part of the substrate that includes an electrical conduction path, such as formed by techniques known to those skilled in the art, such as copper or other electrical traces.

A diode 72 receives light (or transmits in a transmitter portion) emitted from the fiber optic cable and passes electrical current through the electrically conductive extension member 70 into the electronic die 68. This diode 72 may be an emitter diode, which could be a laser diode, light emitting diode, detector diode, positive-intrinsic-negative (p-i-n), avalanche photodetector, or metal-semiconductor-metal (msm) photodetector. The optical fiber is mounted in communication with the optoelectronic transducer assembly at the open end of the foreign module. Sometimes the optical fibers are formed as a "pigtail," as known to those skilled in the art, or as a shorter stub piece, also known to those skilled in the art. The fiber optic can have a core of about 50 microns, but also includes the other metal sleeve and protective shielding, as known to those skilled in the art.

FIG. 5 illustrates another possible embodiments where a stripe laser 80, also known as a DFB laser diode or fabry perot laser diode, is positioned on a ceramic 82 and copper mounting block 84 that support the laser. In FIG. 4, a diode, such as an emitter, laser, LED, detector, p-i-n, msm, or vertical cavity surface emitter laser, i.e., VCSEL 90, is supported by the substrate and includes a prism 92 on top of the pin diode to allow the appropriate conversion of optical signals. As noted before, FIG. 3A illustrates how a plurality of optoelectronic transducer assemblies can be mounted within the optical interconnect module and connect to the appropriate fiber optic communication signals that pass through the optical fiber back plane 12.

The present invention is advantageous because not only is there separate cooling of optoelectronic transducer assemblies in these low profile optical interconnect modules, but there is also a separation of the optoelectronic transducer assembly from other components mounted on the outer circuit carrying faces.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An optical interconnect module comprising:
   a pair of rectangular configured circuit boards each having an outer circuit carrying side and spaced in close proximity to each other to define an inner plenum between the boards, and an open end;
   a mounting member engaging the circuit boards and securing the boards together to form a module;
   a plurality of electronic components mounted on the outer circuit carrying sides;
   a cooling core mounted within the inner plenum and engaging the circuit boards for cooling the electronic components mounted on the circuit boards as coolant is passed through the cooling core;
   at least one optoelectronic transducer assembly mounted at the open end of the formed module and operatively connected to a circuit carrying side of one of said circuit boards, wherein said cooling core engages said optoelectronic transducer assembly to provide cooling to the transducer assembly; and
   an optical fiber mounted in communication with said optoelectronic transducer assembly at the open end of the formed module.

2. An optical interconnect module according to claim 1, wherein said optoelectronic transducer assembly further comprises a substantially planar substrate having a die carrying face mounted opposite the circuit carrying side of the circuit board, and electronic die mounted on the die carrying face, wherein at least one of said electronic die mounted on said die carrying face is electrically connected to a circuit on said circuit carrying side.

3. An optical interconnect module according to claim 2, and further comprising a circuit carrying extension mounted on said planar substrate and extending over said open end of said formed module, and a diode mounted on the circuit carrying extension.

4. An optical interconnect module according to claim 1, wherein said optoelectronic transducer assembly further comprises a substantially planar substrate having a die carrying face mounted opposite the circuit carrying side of the circuit board, and electronic die mounted on the die carrying face, wherein at least one of said electronic die mounted on said die carrying face is electrically connected to a circuit on said circuit carrying side, and a laser supported by said planar substrate and mounted over said open end of said formed module.

5. An optical interconnect module according to claim 4, and further comprising a copper mounting block and ceramic support member for supporting said laser on said planar substrate.

6. An optical interconnect module according to claim 1, wherein said optoelectronic transducer assembly further comprises a substantially planar substrate having a die carrying face mounted opposite the circuit carrying side of the circuit board, and electronic die mounted on the die carrying face, wherein at least one of said electronic die mounted on said die carrying face is electrically connected to a circuit on said circuit carrying side, and a diode and prism supported by said planar substrate and mounted over said open end of said formed module.

7. An optical interconnect device according to claim 1, wherein said cooling core comprises a perforated core member through which fluid is passed between the pair of rectangular configured printed wiring circuit boards.

8. An optical interconnect device according to claim 1, wherein said coolant comprises a fluid.

9. An optical interconnect device according to claim 1, wherein said coolant comprises a gas.

10. An optical interconnect device according to claim 1, wherein said cooling core further comprises an inlet and outlet for fluid.

11. An optical interconnect module comprising:
   a pair of rectangular configured circuit boards each having an outer circuit carrying side and spaced in close proximity to each other to define an inner plenum between the boards, and an open end;
   a mounting member engaging the circuit boards and securing the boards together to form a module;
   a plurality of electronic components mounted on the outer circuit carrying sides;
   a cooling core mounted within the inner plenum and engaging the circuit boards for cooling the electronic components mounted on the circuit boards as coolant is passed through the cooling core;
   a plurality of optoelectronic transducer assemblies mounted at the open end of the formed module and operatively connected to the circuit carrying side of the circuit board, said transducer assembly further comprising a substantially planar substrate having a die carrying face that opposes a circuit carrying side of a circuit board, and electronic die mounted on the die carrying face, wherein at least one of said electronic die mounted on said die carrying face is electrically connected to a circuit on said circuit carrying side, an electrically conductive extension member extending from said planar substrate over said open end of said formed module, and a diode for receiving light emitted from a fiber optic cable and passing electrical current through said electrically conductive extension member into said electronic die, wherein said cooling core engages said electrical extension member to provide cooling to the transducer assembly; and an optical fiber mounted in communication with said optoelectronic transducer assembly at the open end of the formed module.

12. An optical interconnect device according to claim 11, wherein said cooling core comprises a perforated core member through which fluid is passed between the pair of rectangular configured printed wiring circuit boards.

13. An optical interconnect device according to claim 11, wherein said coolant comprises a fluid.

14. An optical interconnect device according to claim 11, wherein said coolant comprises a gas.

15. An optical interconnect device according to claim 11, wherein said cooling core further comprises an inlet and outlet for fluid.

16. An optical interconnect assembly comprising:

a fiber optic backplane having a plurality of receiving slots for receiving an optical interconnect module within each slot, said backplane including a cooling circuit and coolant fittings positioned at each slot through which coolant can be passed through an optical interconnect module positioned within each receiving slot, and at least one optical interconnect module connected within a receiving slot, said optical interconnect module further comprising:

a pair of rectangular configured circuit boards spaced in close proximity to each other and having two outer circuit carrying sides, an inner plenum defined between the boards, and an open end;

a mounting member fixed into the receiving slot and engaging the circuit boards and securing the boards together to form a module;

a plurality of electronic components mounted on the outer circuit carrying sides;

a cooling core mounted within the inner plenum and connected to said coolant fittings for receiving coolant, said cooling core engaging the circuit boards for cooling the electronic components mounted on the circuit boards as coolant is passed through the cooling core;

at least one optoelectronic transducer assembly mounted at the open end of the formed module and operatively connected to a circuit carrying side of one said printed wiring circuit boards, wherein said cooling core engages said optoelectronic transducer assembly to provide cooling to the transducer assembly; and an optical fiber mounted in communication with said optoelectronic transducer assembly at the open end of the formed module.

17. An optical interconnect module according to claim 16, wherein said optoelectronic transducer assembly further comprises a substantially planar substrate having a die carrying face mounted opposite the circuit carrying side of the circuit board, and electronic die mounted on the die carrying face, wherein at least one of said electronic die mounted on said die carrying face is electrically connected to a circuit formed on said circuit carrying side.

18. An optical interconnect module according to claim 17, and further comprising a circuit carrying extension mounted on said planar substrate and extending over said open end of said formed module, and a diode mounted on the circuit carrying extension.

19. An optical interconnect module according to claim 16, wherein said optoelectronic transducer assembly further comprises a substantially planar substrate having a die carrying face mounted opposite the circuit carrying side of the circuit board, and electronic die mounted on the die carrying face, wherein at least one of said electronic die mounted on said die carrying face is electrically connected to a circuit formed on said circuit carrying side, and a laser supported by said planar substrate and mounted over said open end of said formed module.

20. An optical interconnect module according to claim 19, and further comprising a copper mounting block and ceramic for supporting said laser.

21. An optical interconnect module according to claim 16, wherein said optoelectronic transducer assembly further comprises a substantially planar substrate having a die carrying face mounted opposite the circuit carrying side of the circuit board, and electronic die mounted on the die carrying face, wherein at least one of said electronic die mounted on said die carrying face is electrically connected to a circuit formed on said circuit carrying side, and a diode and prism supported by said planar substrate and mounted over said open end of said formed module.

22. An optical interconnect device according to claim 16, wherein said cooling core comprises a perforated core member through which fluid is passed between the pair of rectangular configured printed wiring circuit boards.

23. An optical interconnect device according to claim 16, wherein said coolant comprises a fluid.

24. An optical interconnect device according to claim 16, wherein said coolant comprises a gas.

25. An optical interconnect device according to claim 16, wherein said cooling core further comprises an inlet and outlet for fluid.

26. An optical interconnect assembly comprising:

a fiber optic backplane having a plurality of receiving slots for receiving optical interconnect modules within each slot, said backplane including a cooling circuit and coolant fittings positioned at each slot through which coolant can be passed through an optical interconnect module positioned within each receiving slot, and at least one optical interconnect module connected within a receiving slot, said optical interconnect module further comprising:

a pair of rectangular configured circuit boards spaced in close proximity to each other and having two outer circuit carrying sides, an inner plenum defined between the boards, and an open end;

a mounting member engaging the circuit boards and securing the boards together to form a module;

a plurality of electronic components mounted on the outer circuit carrying faces;

a cooling core mounted within the inner plenum and connected to said coolant fittings for receiving coolant, said cooling core engaging the circuit boards for cooling the electronic components mounted on the circuit boards as coolant is passed through the cooling core;

a plurality of optoelectronic transducer assemblies mounted at the open end of the formed module and operatively connected to a circuit carrying face of one said printed wiring circuit boards, said transducer assembly further comprising a substantially planar substrate having a die carrying face that opposes the circuit carrying side of the circuit board, and electronic die mounted on the die carrying face, wherein at least one of said electronic die mounted on said die carrying face is electrically connected to a circuit formed on said circuit carrying face, an electrically conductive extension member extending from said planar substrate over said open end of said formed module, and a diode for receiving light emitted from a fiber optic cable and passing electrical current through said electrically conductive extension member into said electronic die, wherein said cooling core engages said electrical extension member to provide cooling to the transducer assembly; and an optical fiber mounted in communication with said optoelectronic transducer assembly at the open end of the formed module.

27. An optical interconnect device according to claim 26, wherein said cooling core comprises a perforated core member through which fluid is passed between the pair of rectangular configured printed wiring circuit boards.

28. An optical interconnect device according to claim 26, wherein said coolant comprises a fluid.

29. An optical interconnect device according to claim 26, wherein said coolant comprises a gas.

30. An optical interconnect device according to claim 26, wherein said cooling core further comprises an inlet and outlet for fluid.

* * * * *